March 20, 1928. 1,663,263
R. W. SHARP
SPRAYING NOZZLE FOR MACERATING MACHINES AND THE LIKE
Filed March 22, 1924 2 Sheets-Sheet 1
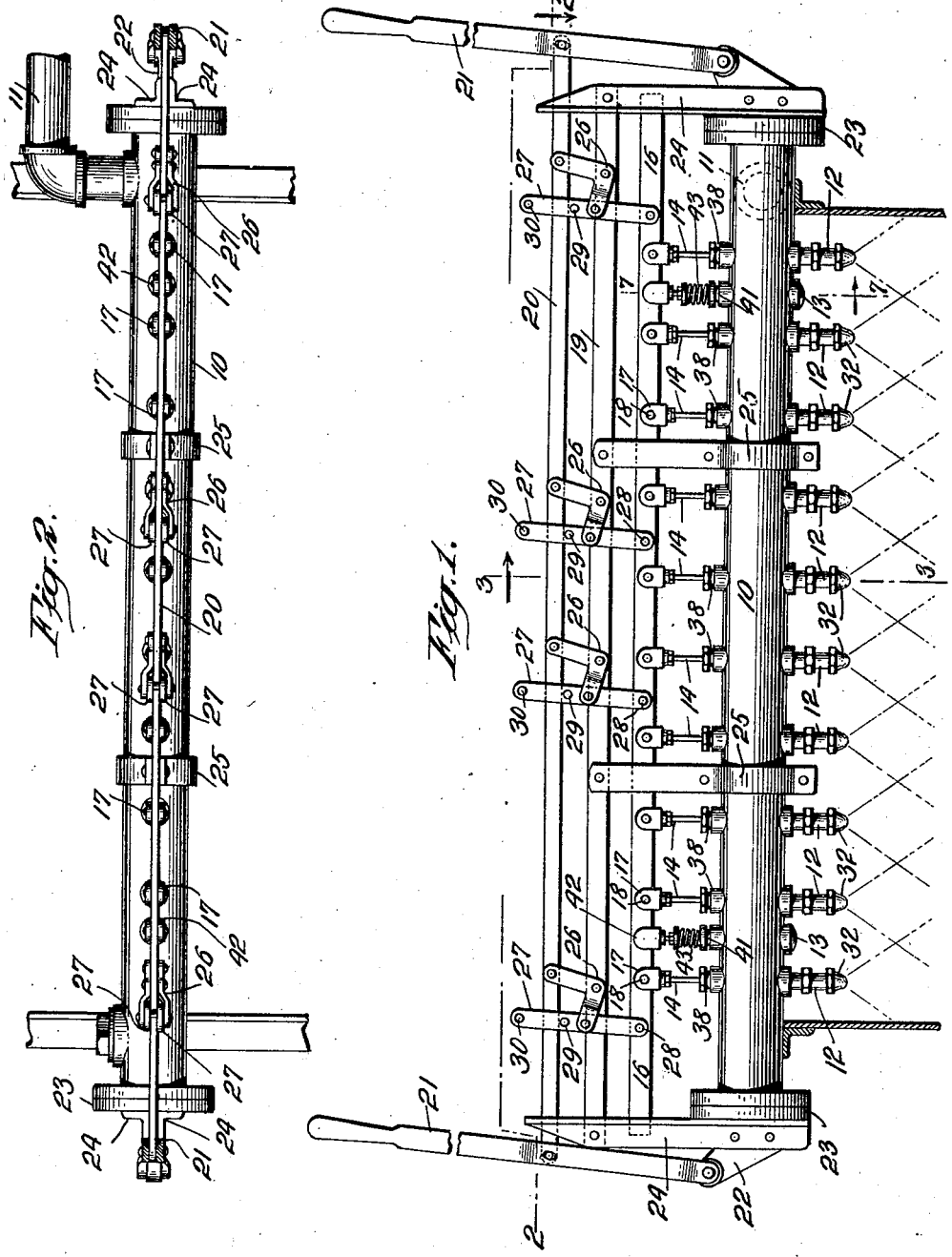
INVENTOR
Robert W. Sharp
BY
Chas. C. Gill
ATTORNEY

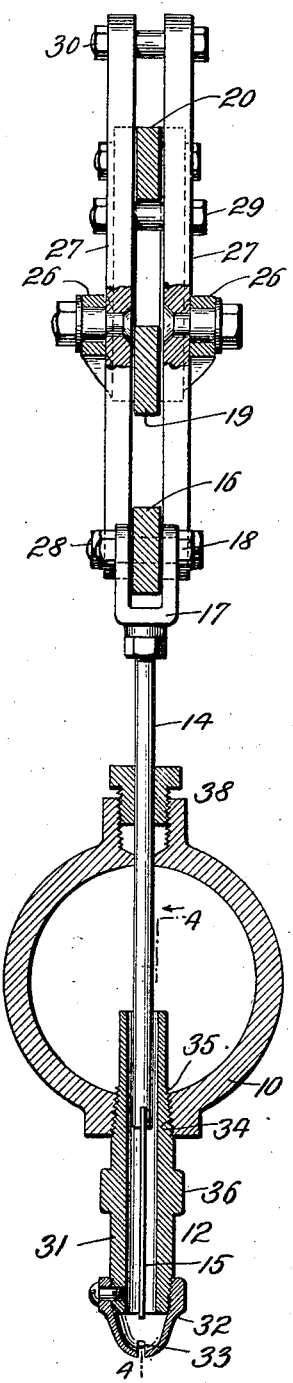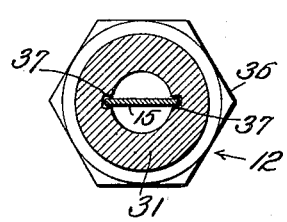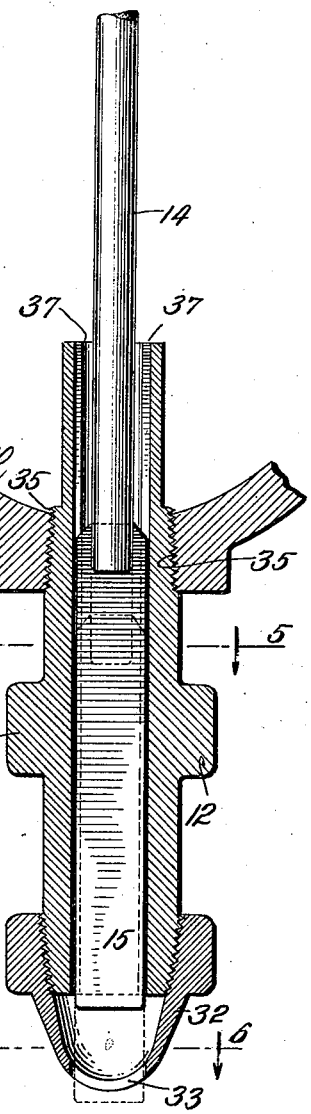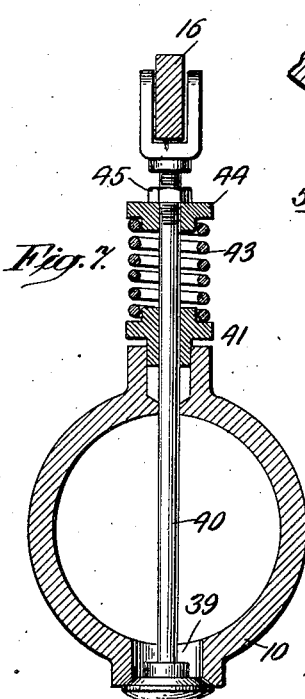

Patented Mar. 20, 1928.

1,663,263

UNITED STATES PATENT OFFICE.

ROBERT W. SHARP, OF BATON ROUGE, LOUISIANA.

SPRAYING NOZZLE FOR MACERATING MACHINES AND THE LIKE.

Application filed March 22, 1924. Serial No. 701,015.

The invention provides an improved macerating machine and has particular reference to spray nozzles for such machines whereby to be capable of use for various purposes, one being for use in connection with sugar cane mills, for saturating a traveling blanket of bagasse either with water or juice or a mixture of both thereof, and I will describe the construction and operation of my invention as applied to use for saturating bagasse on its travel between the successive sets of expressing rollers of a sugar cane mill.

It is to be understood, however, that I do not confine the nozzle of my invention to use for saturating bagasse, because the nozzle is also adapted for use as a sprayer in other associations, as, for illustration, spraying roads or streets, watering gardens or grass plots and spraying disinfectant and germ exterminating solutions, and for analogous uses.

An important object of the invention is to provide in a macerating machine having a series of discharge nozzles for the water or juice, conveniently operated means for efficiently and quickly cleaning the orifices of said nozzles, thereby ensuring a proper flow through the same and the perfect saturation of the bagasse.

A further object of the invention is to provide such devices of reliable and durable character throughout and composed of easily assembled parts, and which will be capable of being readily positioned for use and conveniently operated. Further purposes of the invention will appear hereinafter in connection with the description of the construction and operation of the several parts of the machine.

In carrying out my invention I employ a manifold or pipe of adequate capacity and suitable length, connected with a source of supply of water or juice, or a mixture of both, under pressure, a series of discharge nozzles extending from the lower side of said manifold adapted to deliver the water or liquid in the form of a broad complete sheet against the width of the body or blanket of bagasse traveling from one set of rollers of the mill to another set of rollers for further treatment, blades within the nozzles for cleaning the outlet orifices thereof and means for simultaneously operating all of said blades, the features mentioned being of special construction and arrangement rendering the machine highly efficient.

The invention will be fully understood from the detailed description hereinafter presented, reference being had to the accompanying drawings, in which:

Fig. 1 is a front elevation, partly broken away and partly in section, of a macerating machine embodying my invention;

Fig. 2 is a plan view, partly in section on the dotted line 2—2 of Fig. 1, of the same;

Fig. 3 is a vertical transverse section, on a larger scale through the same, taken on the dotted line 3—3 of Fig. 1;

Fig 4 is a vertical section, partly broken away and on a larger scale, through one of the spraying nozzles and a portion of the manifold and showing the cleaning blade of that nozzle in its retired position;

Fig. 5 is a horizontal section through the same, taken on the dotted line 5—5 of Fig. 4;

Fig. 6 is a like section through the same, taken on the dotted line 6—6 of Fig. 4, and Fig. 7 is a vertical transverse section through a portion of the apparatus, taken on the dotted line 7—7 of Fig. 1.

In the drawings, 10 designates a main pipe or manifold, 11 a supply pipe for water leading thereto, 12 a series of corresponding spray-nozzles connected with said manifold at the lower side thereof, 13 flush-valves at the lower side of said manifold for occasional use in draining or cleaning out the manifold, 14 a series of rods, preferably bronze, extending downwardly through the top of the manifold and into the nozzles 12 and each carrying a flat vertically movable cleaning-blade 15 at its lower end, 16 a vertically movable horizontal bar or beam above and parallel with the manifold and to which by means of forks 17 and bolts 18 the series of rods 14 are connected, 19 a stationary bar or beam located above and being parallel with the bar or beam 16, and 20 a longitudinally shiftable bar or beam above and parallel with the stationary bar or beam 19 and pivotally connected at its ends with manually operative levers 21, which are pivotally secured at their lower ends to brackets 22 located at the ends of the manifold 10.

Upon the ends of the manifold 10 are heads or caps 23, and to these heads or caps are secured angle iron standards 24 between which at each end of the manifold, are secured the brackets 22. The standards 24 are in pairs at each end of the machine and said standards receive between them and serve as guides for the ends of the vertically movable bar 16 and end portions of the longitudinally shiftable bar 20. The standards 24 likewise receive between them the ends of the stationary bar 19, which ends are rigidly secured to said standards.

The manifold 10 is connected with the stationary bar 19 by means of yokes or hangers 25.

Upon the stationary bar 19 is pivotally mounted a series of corresponding pairs of bell-crank levers 26 whose upwardly extending arms are pivotally secured to the shiftable bar 20 and whose other arms are pivotally connected with the pairs of links 27, one link of each pair being at each side of the bars 16, 19 and 20, and said links being pivotally secured to the bar 16 by bolts 28 (Fig. 3) and freely straddling the bars 19, 20. The links 27 of each pair thereof are connected together below the bar 20 by bolts 29 and above said bar by bolts 30, sufficient clearance being left between the bolts 29, 30 for the necessary movement of the bar 20 (Fig. 3).

When the bar 20 is moved endwise in one direction by an attendant operating one of the levers 21, the bell-crank levers 26 are turned on their pivots and act through their shorter arms to lift the links 27 and therethrough the bar 16 and series of rods 14 with their cleaning blades 15, this being the position of the parts shown in the drawings, and when the bar 20 is shifted in a reverse direction the bell-crank levers are turned thereby to move the links 27, bar 16, rods 14 and blades 15 downwardly, the lower position of the blades being indicated by dotted lines in Fig. 4.

The nozzles 12 are all alike and equally spaced apart in a row and each nozzle is composed of a body part 31 and a tip 32 (Figs. 3 and 4), said tip preferably, for accuracy and convenience in manufacture, being in a separate piece and threaded upon or otherwise secured to the lower end of said body part 31. The tip 32 is of cup-shape and contains a segmental discharge slot or elongated orifice 33 whose length is parallel with the length of the manifold 10. The body part 31 of each nozzle is threaded, at 34, to screw into a tapped nozzle-hole 35 in the manifold 10, and each of the nozzles extends upwardly into the manifold a substantial distance above the lower inner surface thereof for the purpose of excluding therefrom to a great extent the dirt and scale that may gather within the manifold. Each nozzle has a hexagonal shoulder 36 to receive a wrench to be used in applying the nozzle to the manifold. The body-part 31 of each nozzle has a vertical cylindrical bore and at opposite sides thereof vertical grooves 37 (Figs. 4 and 5) within which are placed the opposite vertical edges of the vertically movable cleaning blade 15, said blade during its movements being guided in said grooves and being at all times held in correct position within the nozzle by said grooves. The blades 15 always remain within the nozzles and they are thin and flat so as not to unduly obstruct the flow through the nozzles. The blades 15 are about the same in width as the length of the orifices 33, as indicated by the dotted lines in Fig. 4, and said blades when moved to their lower position may extend through and effectually clean said orifices.

The blades 15 are rigidly secured to the lower ends of the rods 14, hereinbefore referred to, which extend upwardly through glands 38 at the top of the manifold 10, all the rods 14 being alike and all being connected with the aforesaid bar 16.

The flush-valves 13 normally close openings 39 (Fig. 7) in the bottom of the manifold 10 and said valves are secured on the lower ends of rods 40 which extend upwardly through glands 41 at the top of the manifold and have on their upper ends upwardly extending forks 42 which straddle the lower edges of the bar 16. The rods 40 also have upon their upper portions the coiled springs 43 whose tension normally seats the valves 13. The springs 43 are confined between the glands 41 and washers 44, which are held in suitably adjusted position by means of nuts 45.

The drawings illustrate the parts of the machine in normal operative position, the blades 15 being in their upper position and the valves 13 being closed. The liquid, under pressure, flows from the supply pipe 11 into the manifold 10 and thence issues against the bagasse, not shown, through the segmental slots 33 of the series of nozzles 12, the liquid discharging in diverging overlapping sprays or streams, as indicated by dotted lines in Fig. 1, and thereby forming a sheet of liquid spray extending transversely across the body of traveling bagasse.

After the machine has been in operation for a length of time, the discharge orifices 33 may become clogged and the manifold 10 may require cleansing, and under this condition the bar 20 will be shifted toward the left, looking at Fig. 1, by force applied thereto from one or the other of the levers 21 or otherwise, and the result of this movement of the bar 20 will be that the bell-crank levers 26, acting through the links 27, will depress the bar 16 and rods 14 and thereby cause all of the blades 15 to descend through the nozzles 12 and pass, at their lower ends, into and through the orifices 33, thereby clearing said orifices of any matter lodged therein and clogging them. The blades 15 snugly fill the orifices 33, having a clearance from the walls thereof of only about .003 of an inch. The bar 20 may be shifted back and forth several times in succession, if found necessary, to reciprocate the blades 15 through the orifices 33 for the purpose of clearing them of foreign matter. The depression of the bar 16 may also be utilized to act on the rods 40 and open the flush-valves 13, thereby permitting the cleaning out of the manifold 10. After the orifices 33 have been cleared and it is desired to resume the operation of the machine, the bar 20 will be returned to its position shown in Fig. 1, this causing the bell-crank levers 26 to effect the elevation of the bar 16 rods 14 and cleaner-blades, said blades then retiring to their upper position, shown in Figs. 3 and 4, and the valves 13 closing under the tension of the springs 43.

I have hereinbefore described the application of the spraying nozzle of my invention to the saturation of bagasse, but as hereinbefore indicated I do not confine the invention to use in sugar cane mills, since the device is useful for spraying roads or streets, watering gardens and the like and spraying disinfectant and germ exterminating solutions and for other or analogous purposes.

I have presented my invention herein as embodied in the most satisfactory form of machine at this time known to me, but I do not limit my invention to all of the details of arrangement and construction shown and described, since I am aware that these details admit of modification without departure from the spirit of my invention or the scope of the appended claims.

What I claim as my invention and desire to secure by Letters-Patent, is—

1. In a spraying nozzle for macerating machines, a body portion having a cylindrical bore, longitudinal grooves on opposite sides of the bore, a thin blade adapted to slide in said grooves, a rod attached to the blade, a detachable tip provided with an elongated slot and means for reciprocating the blade in the grooves and slot.

2. A nozzle for macerating or similar machines, comprising a body portion adapted to be fitted to the bottom of a manifold of said machine, a thin longitudinally elongated cleaner blade, guide slits in the nozzle body for guiding the cleaner blade, and an elongated segmental outlet orifice at the base of the nozzle.

3. A nozzle for macerating or similar machines, comprising a body portion having a longitudinal bore and provided on its inner surface with opposed longitudinal grooves, in combination with a thin longitudinally elongated cleaner blade adapted to reciprocate in said grooves, and a tip portion having a slit disposed in the path of movement of said cleaner blade.

Signed at Caibarien, in the Province of Santa Clara and Republic of Cuba, this 11th day of March A. D. 1924.

ROBT. W. SHARP.